June 9, 1931.  A. HEYBOER  1,809,383
EDIBLE PRODUCT
Filed Feb. 4, 1929
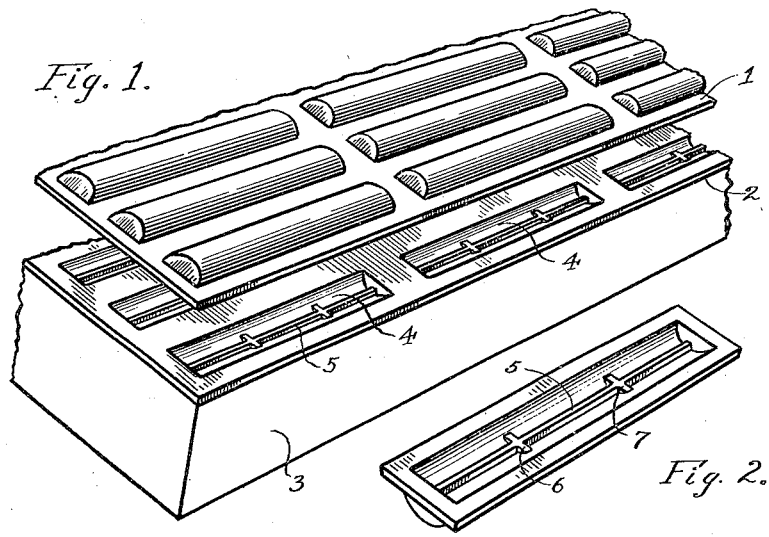
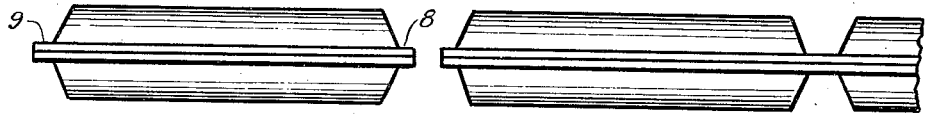
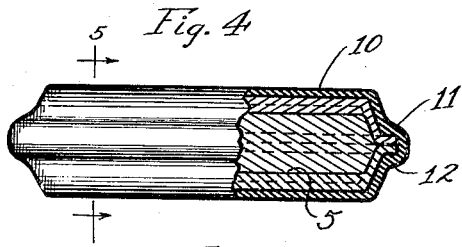
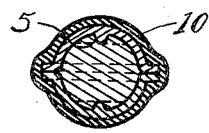
INVENTOR
Adrian Heyboer,
BY
ATTORNEY
Witness:

Patented June 9, 1931

1,809,383

UNITED STATES PATENT OFFICE

ADRIAN HEYBOER, OF GRAND RAPIDS, MICHIGAN

EDIBLE PRODUCT

Application filed February 4, 1929. Serial No. 337,215.

This invention relates to the method of making an edible product of the confection type.

The main objects of this invention are to provide an improved form of edible product in which the outer coating acts as a seal for binding the shell or crust of the article together; to provide a product of this character which will withstand changes and variations in temperature and weather conditions without having a deleterious effect upon the product; and to provide an improved form of container shell crust for such a product.

An illustrative embodiment of this invention is shown in the accompanying drawings, in which:

Fig. 1 is a fragmentary view in perspective of two portions of baked crust shown in spaced relation to each other illustrating the manner in which the crusts are placed together.

Fig. 2 is a view in perspective of one of the elongated crust portions severed from the sheet showing the interior strengthening ribs.

Fig. 3 is a side elevation of the product during the course of its manufacture and showing a portion at the left side of the figure severed from the fragmentary end of a sheet.

Fig. 4 is a view partly in elevation and partly in section of a completed article showing the filling material, baked crusts surrounding the same, and the outer coating of confection which seals the crusts together.

Fig. 5 is a sectional view taken on the line 5—5 of Fig. 4.

Heretofore many attempts have been made to make an edible product of this general character wherein two elongated baked crusts of semi-cylindrical shape are filled with a soft edible substance such as is ordinarily used in the confectionery trade. The two shells are then placed together and the product coated with a suitable frosting such as chocolate or the like.

Such attempts have been failures due to the fact that changes of temperature and humidity will cause the two half shells to warp and spring apart particularly at the ends. Very often the ends of such elongated "sticks" will warp apart as much as a quarter to a half of an inch thereby ruining the product and precluding its sale by the dealers.

After considerable effort and experimentation I have discovered that if the molds for making such a product are designed so as to have closed ends and to leave a marginal edge particularly at the ends of the sticks after they have been severed from a sheet of crust, which marginal edge lies in the same plane and parallel with and preferably in contact with its complementary half shell, the chocolate coating or other covering will accumulate in a thicker layer at these ends and will act as a binder for holding them together.

The method of making this article is as follows:

Sheets of baked crust 1 and 2 such as are produced on the molds shown in my Patent No. 1,740,649 of December 24, 1929, are supported upon a suitable filler block 3 and the elongated semi-cylindrical depressions 4 in the crusts are filled with a suitable confection material such as is commonly used in the grade. The depressions 4 have upstanding longitudinally extending ribs 5 in the bottom thereof and cross ribs 6 and 7 all of which are for the purpose of strengthening the shell of baked crust. These ribs 5, 6, and 7 also tend to keep the shell from warping when subjected to climatic changes. After two such sheets have had their depressions filled with the confection they are placed face to face with the depressions in one sheet in registry with those in the other. It will be noted that the depressions 4 are in substantially spaced relation to each other, leaving a flat plane surface in between the different depressions.

The filled sheets are then severed as shown in Fig. 3 between the filled portions in such manner as to leave substantial marginal edges 8 and 9 at the opposite ends thereof. Such marginal edges may also be provided along the longitudinal sides of the "stick" although these last-mentioned marginal edges are not essential to a successful product. The confection sticks are then coated with a suitable frosting material such as chocolate or the like and as shown in Fig. 4 the marginal ends 8 and 9 which protrude out from the body of the product cause the outer coating 10 to accumulate to a considerable thickness as shown at 11 and 12 on the ends of the stick. This extra thickness of outer coating caused by the accumulation of the frosting acts as an effective and efficient seal for holding the ends of the sticks securely together; that is, it acts as a binder so that the two half shells will not warp and spring apart and also open up when subjected to varied climatic conditions.

Although but one specific method has been herein shown and described, it will be understood that numerous details of the method disclosed may be altered or omitted without departing from the spirit of this invention as defined by the following claim:

I claim:

An edible product of the class described comprising a pair of narrow longitudinal shells consisting of crusts and provided with end walls and having horizontal marginal flanges extending around the sides and ends of the shells, central longitudinal strengthening ribs arranged interiorly of the shells and extending from one end wall to the other, interiorly arranged transverse strengthening ribs extending in opposite directions from the central rib to the side walls of the shells, said shells being placed together with their longitudinal flanges fitted flat against each other to form a hollow stick, and filling in said stick.

In testimony whereof I have hereunto set my hand at Grand Rapids, Michigan this 31st day of January, 1929.

ADRIAN HEYBOER.